Oct. 4, 1966 H. BECKER 3,276,761
TENSILE SPRING RING FOR SHAFT PACKINGS
Filed May 12, 1964
FIG.1
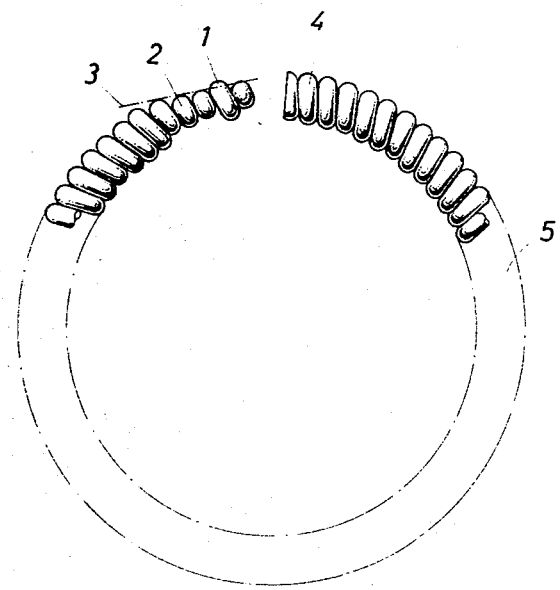
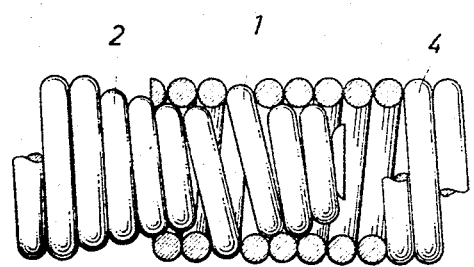
FIG.2
Inventor
Hans BECKER
By Toulmin & Toulmin
Attys

United States Patent Office 3,276,761
Patented Oct. 4, 1966

3,276,761
TENSILE SPRING RING FOR SHAFT PACKINGS
Hans Becker, Leichlingen, Germany, assignor to Goetzewerke Friedrich Goetze A.-G., Dusseldorf, Germany
Filed May 15, 1964, Ser. No. 367,626
Claims priority, application Germany, May 28, 1963,
G 37,834
6 Claims. (Cl. 267—1)

This invention relates to springs, particularly to endless tension springs, sometimes known as garter springs and utilized for pressing packings and boots and seal elements and the like inwardly against the surface to be sealed, such as a rotary shaft.

Endless tension springs of the nature referred to are known and can be made up, for example, by taking a length of spring and bringing the ends together and joining them to make an endless resilient band. One way of joining the ends in a spring of this nature is by adhesive, such as solder, but this is a consistently time consuming operation and can even make the spring less efficient by loading up a number of the spring convolutions with solder. In addition, the solder increases the weight of the spring.

Another manner of joining the ends of a length of tension spring to produce an endless band is to telescope the ends of the spring together so that the convolution of one end will grip the convolution of the other end. This telescoping can be done by pushing the ends together if the spring is not too stiff, or by screwing the ends together to bring about a predetermined amount of telescopic engagement of the ends.

The last-mentioned method of joining the spring ends is to be preferred because it eliminates the soldering or adhesive applying application and adds no weight to the spring and interferes with the performance thereof to the minimum degree, but heretofore such interconnection of the spring ends has been defective for retaining the ends in engagement unless the telescoping region was made extremely long with obvious disadvantages in the cost of manufacture, weight of the spring band, and time to assemble the ends.

In the United States Patent 2,991,064, an attempt has been made to improve a spring band of the nature referred to by forming on one end of the length of spring a number of relatively open convolutions, or spaced convolutions, while at the other end a number of convolutions are formed spaced apart and tapering inwardly whereby the screwing together of the ends of the spring is facilitated. This spring arrangement however is lacking in security of the engagement of the ends with each other. The present invention is directed specifically to an improvement in the type of annular spring band which is made from a length of tension spring material with convolutions at one end of the length that taper inwardly.

With the foregoing in mind, it will be evident that the primary object of the present invention is the provision of an improved spring band for use with shaft seals, packing and the like.

Another object of this invention is the provision of an improved construction for a spring band of the nature referred to which will result in more secure joining of the ends thereof.

Still another object of this invention is the provision of a length of tension spring having the ends so formed that they can be fixedly joined together without the use of solder or adhesive and without making use of an excessive amount of the length of the spring for effecting the joint between the ends.

The present invention is based on the idea that the spring convolutions at opposite ends of the spring length to be made into the band should be tightly coiled but without space therebetween and with one end of the spring being tapered and having at least one convolution, preferably the second or third convolution, from the end projecting outwardly beyond the envelope of the conical end portion whereby, upon screwing the ends of the spring length together, the projecting convolution will be seated between two adjacent convolutions of the other end of the spring length. The outwardly projecting convolution does not extend beyond the envelope of the entire spring so that nothing protrudes outwardly from the spring band after it is formed.

The connecting together of the ends of the length of spring can be facilitated if the convolutions at the conical end thereof are not prestressed as much as the other convolutions of the spring with respect to the tightness with which the convolutions bear against each other in the axial direction of the spring.

It has been found that spring bands constructed according to the present invention will not become disconnected either by vibrational forces or by tensional forces in the spring. The region of the joint in the spring where the ends are brought together is not stiffened in the usual manner and thus full elasticity is exhibited by the spring band.

The exact nature of the present invention will be more fully undestood upon reference to the accompanying drawings wherein:

FIGURE 1 is an elevational view of a spring band according to the present invention before the ends thereof are joined together, and FIGURE 2 is a view drawn at enlarged scale and partly in section, showing the ends of the spring joined together.

Referring to the drawings somewhat more in detail, the length of the spring is indicated by reference 5 and has one end portion 4 thereon which is cylindrical and which consists of consecutive convolutions all of the same diameter and closely adjacent each other and preferably pre-tensioned in the direction of the length of the spring.

The other end of the spring has a conical end portion designated 2 and which conical portion falls within a conical envelope, one side of which is indicated at 3 with the exception of the second or third convolutions, indicated at 1, and which projects outwardly beyond envelope 3. The convolutions at conical end 2 of the spring are also in face to face engagement preferably pre-tensioned in the axial direction of the spring but probably less so than the pre-tension of the convolutions 4.

The appearance of the spring joint after the ends have been screwed together is shown in FIGURE 2 wherein it will be seen that outwardly projecting convolution 1 is seated between adjacent ones of the convolutions of the cylindrical end 4 of the spring. Projection convolution 1, however, does not extend outwardly beyond the limits of the cylindrical end of the spring.

The joint obtained in this manner is extremely secure and will not pull apart even under conditions of vibration or high tension on the spring. The strength obtained by the inner meshing of the convolutions at the opposite ends of the spring length adds a great deal of strength to the spring joint, but does not materially increase the stiffness of the spring in that region and, furthermore, is accomplished by a telescopic joint of relatively short length.

It will be understood that this invention is susceptible to modification in order to adapt it to different usages and conditions; and accordingly, it is desired to comprehend such modifications within this invention as may fall within the scope of the appended claims.

What is claimed is:

1. A length of tension spring adapted for having its ends joined together to form a spring band and comprising; a series of convolutions with at least those convolutions at the ends of the spring in face to face engagement, the outside diameter of one of said ends being slightly larger than the inside diameter of the other of said ends so said ends can be screwed together to form the spring band, at least one convolution of a first of said ends being displaced radially from the envelope of the other convolutions of the said first end in a direction such that when said ends are screwed together said one convolution will press adjacent convolutions of the second of said ends apart and will seat between said adjacent convolutions of said second end and be gripped therebetween so as to hold the screwed together ends firmly together.

2. A length of tension spring according to claim 1 in which said one convolution is one of the second and third convolutions from the extreme end of the said first end of the spring, one of said ends having a tapered lead-in portion at the extreme end to facilitate threading said ends together.

3. A spring band consisting of a length of tension spring having its ends joined together, one of said ends consisting of convolutions in face to face engagement and all of the same diameter, the other of said ends comprising a plurality of convolutions in face to face engagement and tapering inwardly toward the end of the spring so said other end can be screwed into said one end, one convolution of said conical end extending outwardly beyond the envelope of the said conical end so that when the ends are screwed together said one convolution will separate adjacent convolutions of said one end of the spring and will seat between the said adjacent convolutions thereby to retain the said ends firmly together.

4. A spring band according to claim 3 in which said one convolution has a diameter not greater than the diameter of the convolutions at the said one end of the spring.

5. A spring band according to claim 4 in which said one convolution is one of the said second and third convolutions of the conical end of the spring counting from the extreme end of the spring.

6. A spring band according to claim 5 in which the convolutions are prestressed toward each other and wherein the prestressing of the convolutions at the conical end of the spring is less than the prestressing of the convolutions at the cylindrical end of the spring.

References Cited by the Examiner

UNITED STATES PATENTS

| | | | |
|---|---|---|---|
| 2,991,064 | 7/1961 | DeJean | 267—1 |
| 3,011,775 | 12/1961 | McLeod | 267—1 |

ARTHUR L. LA POINT, *Primary Examiner.*

R. M. WOHLFARTH, *Assistant Examiner.*